United States Patent
Pathak et al.

(10) Patent No.: US 10,264,079 B2
(45) Date of Patent: Apr. 16, 2019

(54) FASTPATH WEB SESSIONS WITH HTTP HEADER MODIFICATION BY REDIRECTING CLIENTS

(71) Applicant: Cisco Technology, Inc., San Jose, CA (US)

(72) Inventors: Manish Pathak, San Jose, CA (US); Venkatesh N. Gautam, Sunnyvale, CA (US); Jianxin Wang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 15/157,621

(22) Filed: May 18, 2016

(65) Prior Publication Data

US 2017/0339253 A1 Nov. 23, 2017

(51) Int. Cl.
*G06F 13/00* (2006.01)
*H04L 29/08* (2006.01)
*H04L 29/06* (2006.01)

(52) U.S. Cl.
CPC .......... *H04L 67/142* (2013.01); *H04L 67/146* (2013.01); *H04L 69/22* (2013.01)

(58) Field of Classification Search
CPC ............... H04L 29/08072; H04L 29/06; H04L 29/0809; H04L 29/06047; H04L 67/142; H04L 67/146; H04L 69/22; G06Q 30/02

USPC ......................................................... 709/203
See application file for complete search history.

(56) References Cited

U.S. PATENT DOCUMENTS

| | | | |
|---|---|---|---|
| 7,099,915 B1* | 8/2006 | Tenereillo ........... | H04L 67/1008 709/203 |
| 7,412,539 B2 | 8/2008 | Gmuender et al. | |
| 8,370,940 B2 | 2/2013 | Holloway et al. | |
| 9,124,628 B2 | 9/2015 | Shankar et al. | |
| 9,237,168 B2 | 1/2016 | Wang et al. | |
| 2011/0231651 A1* | 9/2011 | Bollay ................. | H04L 63/166 713/152 |
| 2011/0231923 A1* | 9/2011 | Bollay ................. | H04L 63/166 726/9 |
| 2012/0174196 A1 | 7/2012 | Bhogavilli et al. | |

* cited by examiner

*Primary Examiner* — Robert B Harrell
(74) *Attorney, Agent, or Firm* — Edell, Shapiro & Finnan, LLC

(57) ABSTRACT

A handshake procedure to establish a first connection between a client and a server is monitored at an intermediate network device. A request message sent to the server from the client is received at the intermediate network device. The request message includes parameters defining a manner of receiving information from the server. The parameters defining the manner of receiving information from the server are modified to produce modified parameters. A redirect message is sent from the intermediate network device to the client to induce or cause the client to establish a second connection with the server based upon the modified parameters, wherein the redirect message contains the modified parameters.

20 Claims, 8 Drawing Sheets

Hypertext Transfer Protocol
GET / HTTP/1.1\r\n
[Expert Info (Chat/Sequence): GET / HTTP/1.1\r\n]
[Message: GET / HTTP/1.1\r\n]
[Severity level: Chat]
[Group: Sequence]
Request Method: GET
Request URI: /
Request Version: HTTP/1.1
Host: example.com\r\n
Connection: keep-alive\r\n —— 326
Accept: text/html,application/xhtml+xml,application/xml;q=0.9,image/webp,*/*;q=0.8\r\n
User-Agent: Mozilla/5.0 (Macintosh; Intel Mac OS X 10_9_5) AppleWebKit/537.36 (KHTML, like Gecko) Chrome/43.0.2357.134 Safari/537.36\r\n —— 324
DNT: 1\r\n
Accept-Encoding: gzip, deflate, sdch\r\n
Accept-Language: en-US,en;q=0.8\r\n
\r\n

Hypertext Transfer Protocol
HTTP/1.0 301 Moved Permanently\r\n
[Expert Info (Chat/Sequence): HTTP/1.0 307 Moved Permanently\r\n]
[Message: HTTP/1.0 307 Moved Permanently\r\n]
[Severity level: Chat]
[Group: Sequence]
Request Version: HTTP/1.0
Status Code: 307
Response Phrase: Moved Permanently
Server: SimpleHTTP/0.6 Python/2.7.9\r\n
Date: Tue, 28 Jul 2015 17:19:46 GMT\r\n
Set-Cookie: safesearch_cookie="true"\r\n  426
Location: http://example.com/\r\n
\r\n

FIG.4

Hypertext Transfer Protocol
GET / HTTP/1.1\r\n
[Expert Info (Chat/Sequence): GET / HTTP/1.1\r\n]
[Message: GET / HTTP/1.1\r\n]
[Severity level: Chat]
[Group: Sequence]
Request Method: GET
Request URI: /
Request Version: HTTP/1.1
Host: example.com\r\n
Connection: keep-alive\r\n
Accept: text/html,application/xhtml+xml,application/xml;q=0.9,image/webp,*/*;q=0.8\r\n
User-Agent: Mozilla/5.0 (Macintosh; Intel Mac OS X 10_9_5) AppleWebKit/537.36 (KHTML, like Gecko) Chrome/43.0.2357.134 Safari/537.36\r\n
DNT: 1\r\n
Accept-Encoding: gzip, deflate, sdch\r\n
Accept-Language: en-US,en;q=0.8\r\n    536
Cookie: safesearch_cookie="true"\r\n
\r\n

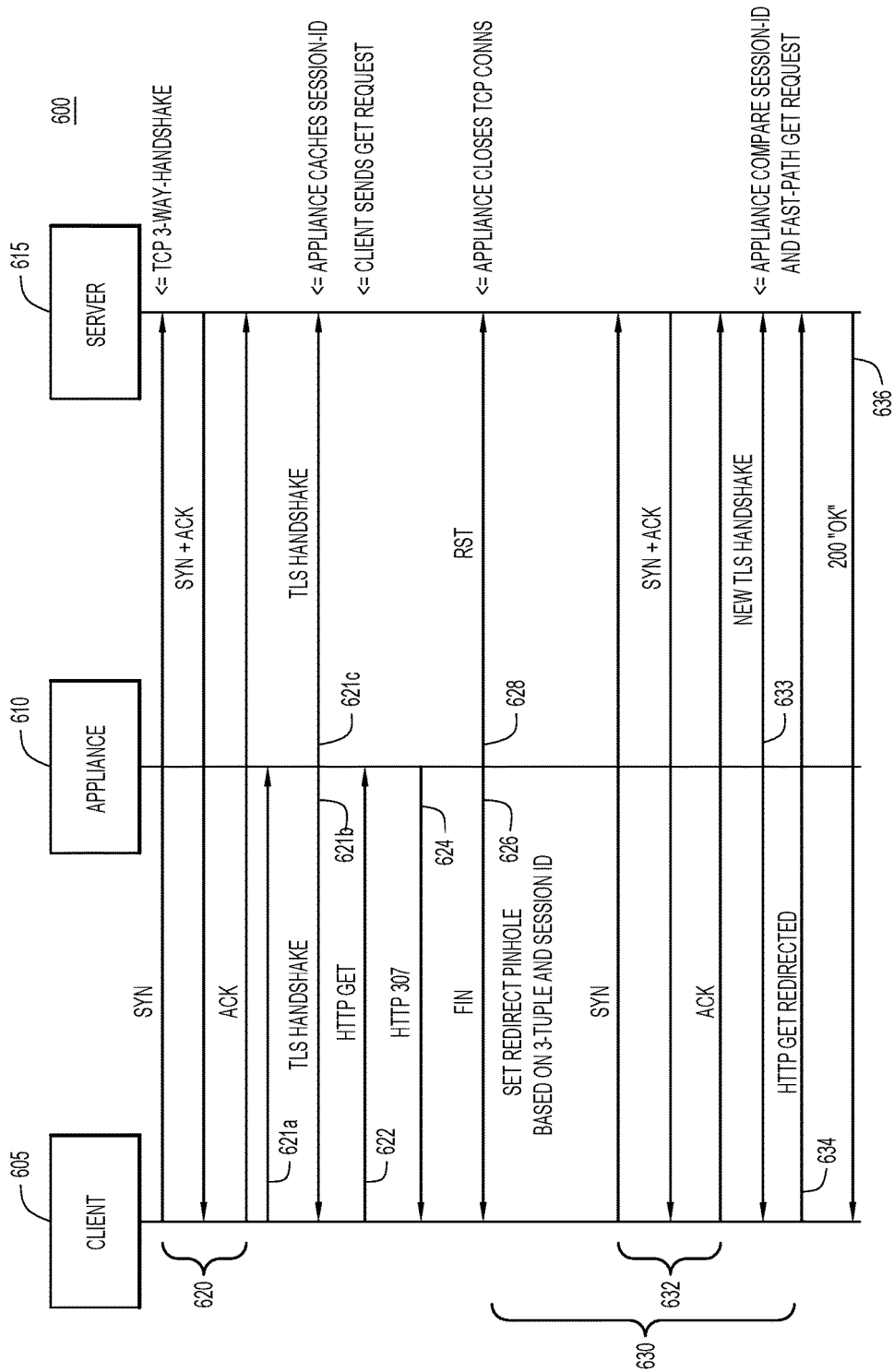

FASTPATH WEB SESSIONS WITH HTTP HEADER MODIFICATION BY REDIRECTING CLIENTS

TECHNICAL FIELD

The present disclosure relates to Hypertext Transfer Protocol (HTTP) sessions, and in particular, applying proxy and firewall services to Hypertext Transfer Protocol traffic

BACKGROUND

The Hypertext Transfer Protocol (HTTP) is an application protocol for distributed, collaborative, hypermedia information systems. HTTP is the foundation of data communication for the World Wide Web. Hypertext is structured text that uses logical links (hyperlinks) between nodes containing text.

In computer networks, a proxy (a computer system or an application) acts as an intermediary for requests from clients seeking resources from servers. Proxies may provide administrative control over the content that may be relayed in one or both directions through the proxy. A firewall is a network security appliance that monitors and controls incoming and outgoing network traffic based on predetermined security rules.

BRIEF DESCRIPTION OF THE DRAWINGS

FIG. 3 is an HTTP request message having a header modified to implement fastpath web sessions, according to an example embodiment.

FIG. 4 is an HTTP redirect message used to implement fastpath web sessions by redirecting clients, according to an example embodiment.

FIG. 5 is an HTTP request message modified in response to a redirect message used to implement fastpath web sessions by redirecting clients, according to an example embodiment.

FIG. 6 is a sequence diagram illustrating message exchanges used to implement fastpath web sessions with Secure HTTP (HTTPs) header modification by redirecting clients, according to an example embodiment.

DESCRIPTION OF EXAMPLE EMBODIMENTS

Overview

In one embodiment, a handshake procedure to establish a first connection between a client and a server is monitored at an intermediate network device. A request message sent to the server from the client is received at the intermediate network device. The request message includes parameters defining a manner of receiving information from the server. The parameters defining the manner of receiving information from the server are modified to produce modified parameters. A redirect message is sent from the intermediate network device to the client to induce or cause the client to establish a second connection with the server based upon the modified parameters, wherein the redirect message contains the modified parameters.

Example Embodiments

Figure 1:
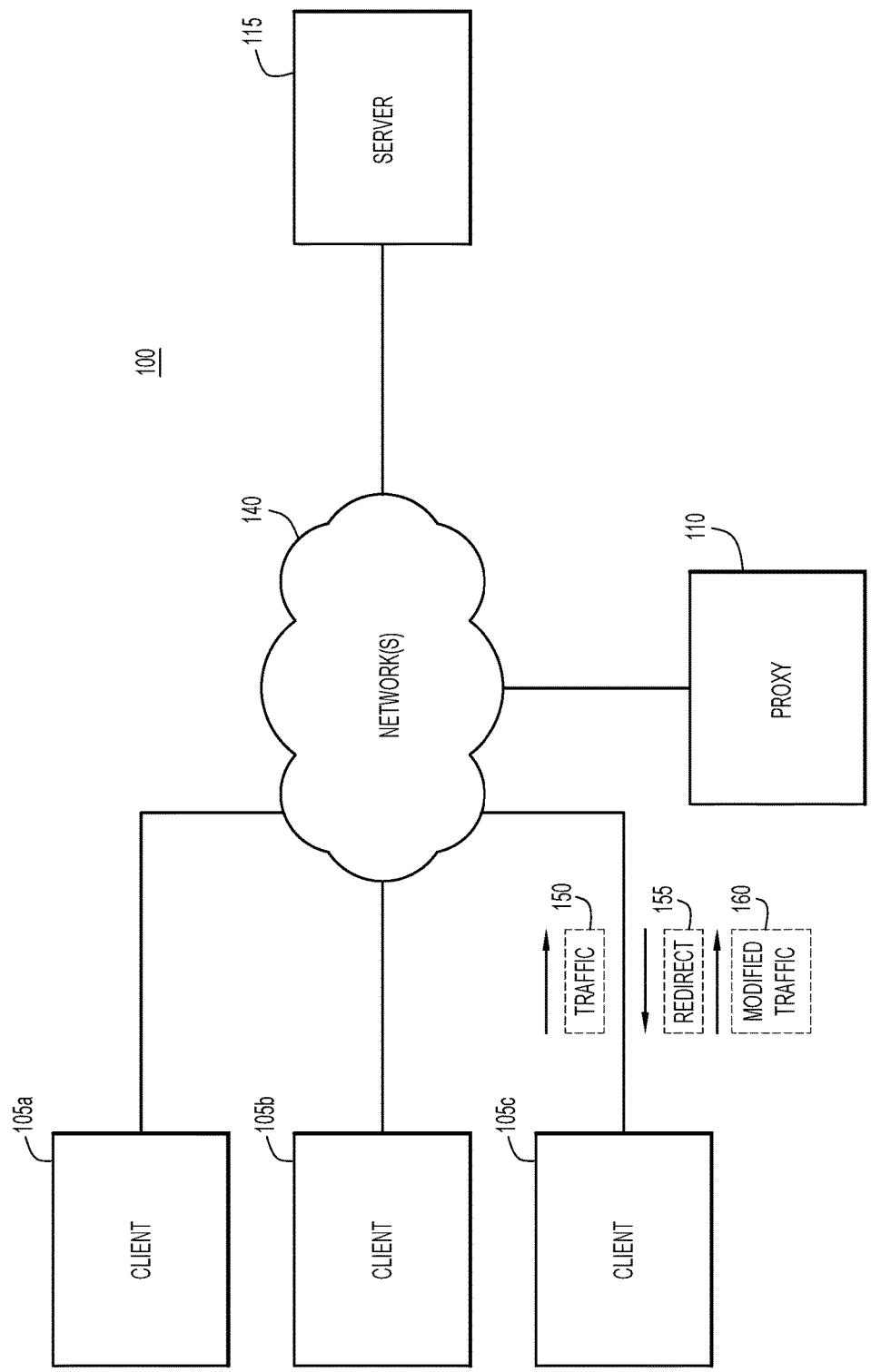
FIG. 1 is a block diagram of a network environment configured to implement fastpath web sessions with HTTP header modification by redirecting clients, according to an example embodiment.

Depicted in FIG. 1 is an example network environment 100 configured to implement fastpath Hypertext Transfer Protocol (HTTP) sessions by redirecting clients. Clients 105a-c are connected to intermediate network device 110, and in turn, to server 115 through network 140. Intermediate device 110 may be embodied as a network appliance, such as a proxy device or a firewall device. Intermediate network device 110 is configured to intercept traffic 150 communicated between any of the clients 105a-c and server 115. Absent the techniques described herein, intermediate network device 110 would be configured to intercept traffic 150, examine the contents of traffic 150, and modify traffic 150 to conform with the policies being enforced by intermediate network device 110 before forwarding the traffic to server 115. Intermediate network device 110, on the other hand, is configured to intercept traffic 150 and examine its contents, but instead of modifying traffic 150, intermediate network device 110 sends redirect message 155 to client 105c. Redirect message 155 induces or causes client 105c to send modified traffic 160. Modified traffic is sent based on the contents of redirect message 155, and is configured to conform with the policies being enforced by intermediate network device 110. Because client 105c is induced or caused to change how traffic is sent to conform with the policies enforced by intermediate network device 110, intermediate network device 110 may allow modified traffic 160 to pass through to server 115 without modification by intermediate network device 110. Examples of this process are described in more detail hereinafter in connection with FIGS. 2-7.

Figure 2:
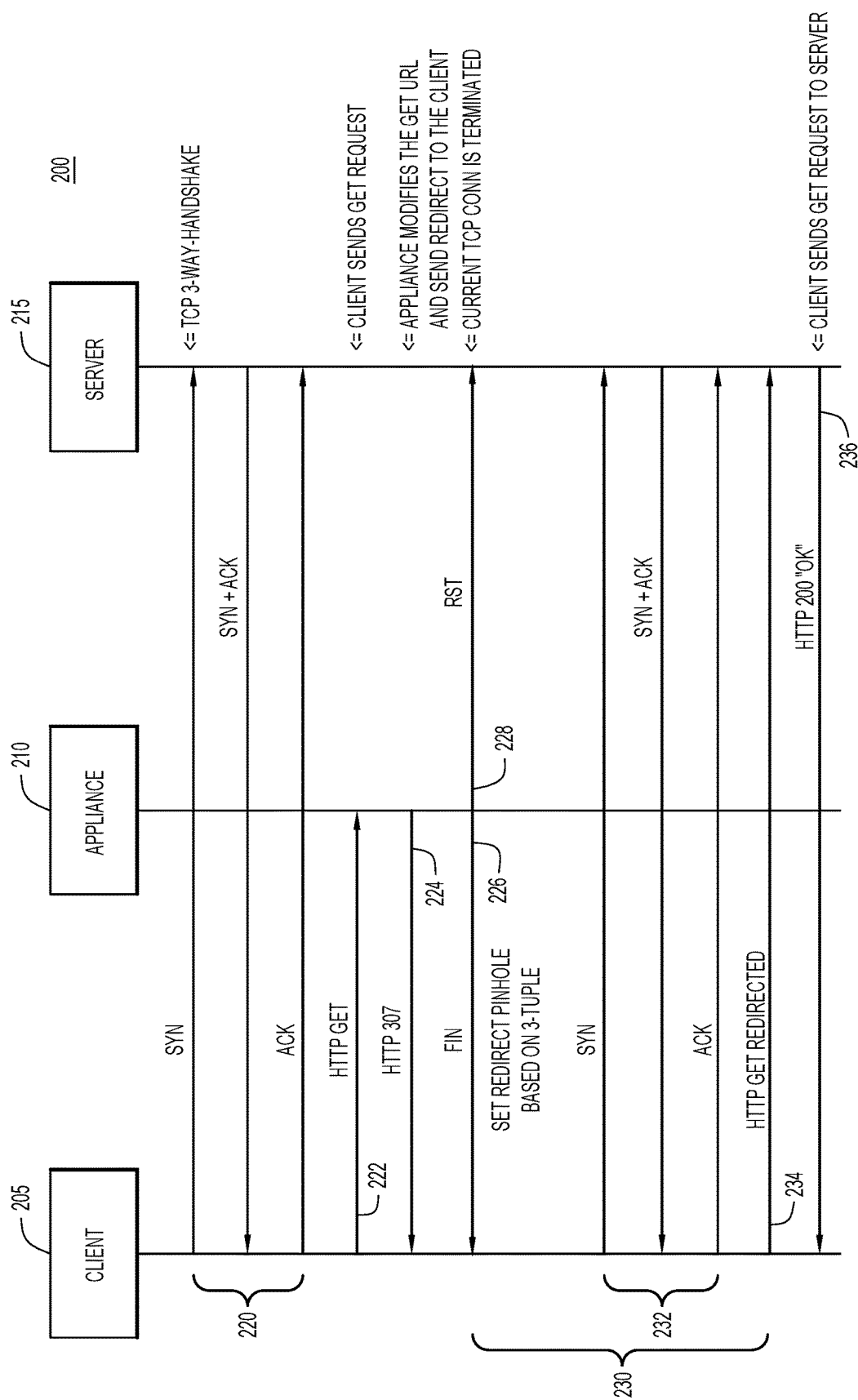
FIG. 2 is a sequence diagram illustrating message exchanges used to implement fastpath web sessions with HTTP header modification by redirecting clients, according to an example embodiment.

With reference made to FIG. 2, depicted therein is a sequence diagram 200 illustrating message exchanges used to implement fastpath web sessions with Hypertext Transfer Protocol (HTTP) header modification by redirecting clients, according to an example embodiment. Specifically, client device 205 establishes a connection with server device 215 though, for example, Transmission Control Protocol (TCP) three-way handshake 220, consisting of Synchronize (SYN) and Acknowledgment (ACK) messages. TCP handshake 220 establishes a first connection between client 205 and server 215. It should be understood that the client 205 may be a physical device with software running thereon or may be embodied as a software/virtual machine process running in a cloud/datacenter environment.

Located between client 205 and server 215 is a network appliance 210. The network appliance 210 is also referred to herein as an intermediate network device. Network appliance 210 may serve one or more network functions, such as providing firewall and/or proxy services for client device 205. Accordingly, appliance 210 may be located at an edge of a secure network in which client 205 is located. Accordingly, when HTTP request message 222 is sent to server 215, it is intercepted by appliance 210. An HTTP request message, in this case a "GET" message, is the message through which a client requests a server do something, such as returning content ("GET" request), posting content ("POST" request), deleting content ("DELETE" request), tracing the connection ("TRACE" request), and others (e.g., "HEAD", "PUT", "CONNECT" and "OPTION" requests). Once intercepted by appliance 210, request 222 is examined to ensure that request message 222 conforms with the policies that appliance 210 is configured to enforce.

Turning briefly to FIG. 3, depicted there is the content of request message 222. An appliance, such as appliance 210 of FIG. 2, will examine the content of request message 222 to ensure that it conforms with certain polices configured on the appliance. In order to apply the correct policies, an appliance may alter the content of request message 222 before sending it to the server to which it was originally addressed. For example, the appliance may limit the type of data that can be received through "Accept" option 324. Other policies may block particular sites, which would be located in "Host" option 326. The appliance may also enforce policies that ensure optional fields are included in request message 222. For example, certain organizations (businesses, schools, etc.) may want to block certain content from being returned to their networks, and accomplish this by requiring that client devices within their networks implement, for example, the "SafeSearch" functionality provided by Google. Content restricting functionality, like SafeSearch, may be implemented through cookies located on a client computer. When a SafeSearch cookie is present, and indicates SafeSearch is implemented, this will be indicated in HTTP request messages through the "Cookie" option of the HTTP request.

Absent from request message 222 is the "Cookie" option shown in FIG. 3, and therefore, request message 222 is not configured to implement SafeSearch. To correct this problem, an appliance may alter request message 222 to include a cookie option, such as:

Cookie: safesearch_cookie="true".

Once modified, the request message is sent to the server. Yet, such a process requires the appliance to continue to analyze and modify subsequent messages sent from the client as part of the connection over which request message 222 was received. In other words, an appliance would need to continually proxy the connection over which the request message was received. Appliance 210 of FIG. 2 takes a different approach.

Returning back to FIG. 2, when request message 222 is received at appliance 210, appliance 210 would analyze the content of request message 222, and determine that the cookie option is absent. Therefore, appliance 210 would determine that request message 222 is not implementing SafeSearch. Instead of modifying request message 222, and sending it along to server 215, appliance 210 creates an HTTP redirect message 224 (i.e., an HTTP message that includes a status code of "307" indicating that it is a redirect message). An HTTP redirect message is a message sent to a client device indicating that some change needs to be made to the request message before it can be successfully carried out, and this change may be included in the redirect message. According to the example of FIG. 2, redirect message 224 includes an indication that the "Cookie" option of the subsequent request message should be included, and that it should indicate that SafeSearch is being implemented. An example of such a redirect message is shown in FIG. 4. As shown in redirect message 224 of FIG. 4, "Cookie" option 426 indicates to the client that subsequent request messages sent to the server should indicate that SafeSearch is being implemented.

Returning back to FIG. 2, once redirect message 224 is sent, appliance 210 closes the connection established through three-way handshake 220 with "FIN" message 226 sent to client 205, and "RST" message 228 sent to server 215. Appliance 210 may then set a pinhole 230 in which it expects to see the connection between client 205 and server 215 reestablished in response to redirect message 224. A pinhole, such as pinhole 230, is a window of time in which special traffic is allowed to pass through a firewall (i.e., through appliance 210) without further inspection. The traffic allowed through appliance 210 within the pinhole is normally expected, and may be identified by, for example, a three-tuple comprised of the client Internet Protocol (IP) address, the server IP address, and the server destination port.

Client 205 initiates a new three-way handshake 232 to establish a new connection with server 215. Once the new connection is established, client 205 sends HTTP request message 234 to server 215. Based upon redirect message 224, request message 234 should correctly indicate that SafeSearch is implemented at client 205. In other words, the parameters for request 234 now conform to the policies being enforced by appliance 210 without appliance 210 taking responsibility for modifying the content of request message 234. Accordingly, appliance 210 need not proxy the communications between client 205 and server 215. FIG. 5 shows an example of a request message 234. Request message 234 is similar to request message 222, but it includes the "Cookie" option 536 that had previously been identified by appliance 210 as being missing from request message 222.

Returning again back to FIG. 2, because request message 234 is received within pinhole 230, it may be passed through appliance 210 without inspection, as will subsequent message exchanges made through the connection established by handshake procedure 232. This may be an acceptable process in some example embodiments because pinhole 230 may be set sufficiently small that it is unlikely that request 234 could be generated and/or be altered in a way other than to conform with redirect message 224. On the other hand, if request message 234 was received outside of pinhole 230, appliance 210 may inspect request message 234 to ensure that it contains the modifications indicated in redirect message 224 (e.g., "Cookie" option 536 of FIG. 5). If request message 234 contains the correct modifications, request message 234 may be passed along to server 215. On the other hand, if request message does not contain the correct modifications, appliance 210 may send another redirect message or it may proxy the communications between client 205 and server 215. Furthermore, depending on the level of security that appliance 210 is configured to apply, request message 234 may be inspected by appliance 210 regardless of whether or not request message 234 is received within pinhole 230. In such an implementation, pinhole 230 may be omitted if all request messages are to be inspected regardless of the timing of their sending and receipt at appliance 210.

Upon receipt of request message 234, server 215 sends HTTP "OK" message 236. In addition to the messages illustrated in FIG. 2, additional messages may also be sent between client 205 and server 215. Furthermore, appliance 210 may intermittently inspect the messages sent between client 205 and server 215 to ensure the messages continue to conform with the parameters indicated in redirect message 224.

Through the process described above, appliance 210 is configured to implement fastpath web sessions with HTTP header modification by redirecting clients. Specifically, appliance 210 redirects the Uniform Resource Locator (URL) sought by client 205 with the HTTP header fields modified as required and terminates the initial connection.

Upon receiving the HTTP redirect, client 205 re-initiates the TCP handshake with server 215 and attempts to fetch the redirect URL. Based upon the policies set by the administrator of appliance 210, if the connection is an HTTP request, then the request on the new connection has the option to skip URL or content inspection. As a consequence, TCP proxying by appliance 210 will not be engaged, and resource and performance gains may be achieved.

With reference now to FIG. 6, depicted therein is a sequence diagram 600 depicting another example embodiment of message exchanges used to implement fastpath web sessions with HTTP header modification by redirecting clients. FIG. 6 differs from FIG. 1 in that it illustrates a secure HTTP (HTTPs) message exchange. This means that once a connection is established between client 605 and server 615, the messages sent between client 605 and server 615 will be encrypted. In order to accommodate this encryption, additional steps are taken, as are discussed below.

The sequence diagram 600 begins in a manner similar to that of FIG. 2. A three-way handshake 620 is performed between client 605 and server 615 to establish a connection between them. Client 605 then attempts to initiates a Secure Sockets Layer (SSL)/Transport Layer Security (TLS) handshake with server 615 through message 621a. A TLS handshake includes an exchange of keys that will allow client 605 and server 615 to securely exchange encrypted messages. In order to proxy the communications between client 605 and server 615, appliance 610 intercepts the initial message 621a of the TLS handshake between client 605 and server 615. Appliance 610 performs a TLS handshake 621b with client 605, as well as a TLS handshake 621c with server 615, thereby inserting itself between client 605 and server 615. Accordingly, appliance 610 will be able to receive and decrypt messages from client 605, apply appropriate services to the messages (e.g., modifying the messages if necessary) and re-encrypt the messages for transmission to server 615. In other words, appliance 610 will be able to proxy the encrypted communications between client 605 and server 615.

When client 605 sends HTTPs request message 622, it will be received and decrypted at appliance 610. Appliance 610 will examine the decrypted contents of request message 622, which may be similar to the contents of request message 222 of FIG. 3. Depending on the content of request message 622, appliance 610 may re-encrypt an unaltered version of message 622 and send it to server 615; apply services to, re-encrypt and send message 622 to server 615; drop message 622 based upon the policies appliance 610 is configured to enforce; or send a redirect message back to client 605. The example of FIG. 6 takes the latter approach, sending redirect message 624 to client 605.

Specifically, similar to the process described above with reference to FIGS. 1-5, appliance 610 may determine that request message 622 is not configured to implement SafeSearch. Accordingly, appliance 610 generates an HTTP redirect message similar to message 222 of FIG. 4 (i.e., the message indicates that client 605 should implement SafeSearch through the HTTP cookie option), encrypts the message according to the keys exchanged in TLS handshake 621b, and transmits encrypted redirect message 624 to client 605.

Appliance 610 will associate the three-tuple associated with the connection established through handshake 620 with the session identifier (ID) associated with the TLS connection established through handshake procedure 621b. The TLS session ID is a value shared during a TLS handshake, normally during the "ClientHello" message of the TLS handshake. Appliance 610 then stores data indicating the combination of the three-tuple and the session ID. Appliance 610 closes the connection established through three-way handshake 620 with "FIN" message 626 sent to client 605, and "RST" message 628 sent to server 615.

Appliance 610 then sets a pinhole in which client 605 may establish a TLS session with server 615 without inserting itself as a proxy between client 605 and server 615. Specifically, in response to redirect message 624, client 605 will attempt to reestablish a connection with server 610, and send a new HTTPs request message to server 615 that includes the updated parameters communicated to client 605 through redirect message 624. Client 605 will initiate a new three-way handshake 632 with server 615. Once handshake 632 is completed, client 605 will initiate a new TLS handshake 633 with server 615. Because client 605 is attempting to reestablish its previous TLS session (i.e., the session established through TLS handshake 621b), the initial message sent from client 605 as part of TLS handshake 633 will include the session ID from TLS handshake 621b. Accordingly, TLS handshake 633 will share the session ID and three-tuple previously stored at appliance 610. Appliance 610 will recognize TLS handshake 633 as client 605 attempting to reestablish a connection with server 615 based upon redirect message 624. Because appliance 610 understands that this new session will conform with the policies it is configured to enforce (i.e., the new session will be established according to the modified parameters sent to client 605 through redirect message 624), appliance 610 will allow client 605 to perform TLS handshake 633 directly with server 615, without appliance 610 inserting itself there between.

Because appliance 610 has not inserted itself into TLS session 633, appliance 610 will not be able to decrypt and inspect traffic sent between client 605 and server 615. Appliance 610 may take steps to ensure that it can trust that the traffic sent from client 605 to server 615 conforms to the policies of appliance 610. For example, pinhole 630 may be set to a sufficiently short duration that it is unlikely that traffic sent subsequent to TLS handshake 633 (e.g., HTTPs request message 634) will be modified in a way that does not conform with the parameters set by redirect message 624. For example, the length of pinhole 630 may be set to a duration that is twice the average Round Trip Time (RTT) for communications between client 605 and appliance 610. In other words, pinhole 630 begins after redirect message 624 is sent, and has a length that is twice RTT. If TLS handshake 633 begins within this time frame, appliance may decide not to proxy the connection. On the other hand, if TLS handshake begins after pinhole 630, appliance 610 may insert itself into (e.g., decrypt and/or proxy) the connection by acting as a TLS proxy.

Additionally, appliance 610 may determine trust ratings for particular client devices, such as client 605. If a trust rating for client 605 is sufficiently high, appliance 610 may allow TLS handshake 633 to complete without appliance 610 inserting itself as a proxy between client 605 and server 615. The trust rating may be based on a history with client device 605. For example, appliance 610 and client 605 may undergo numerous iterations of the process described above with reference to messages 620-633, with appliance 610 inserting itself into TLS handshake 633 as a proxy. Every time client 605 replies to redirect message 624 in a way that conforms with redirect message 624, the trust rating for client 605 will increase. Once the trust rating for client 605 reaches a predetermined threshold, appliance 610 may stop inserting itself into TLS handshake 633 in subsequent iterations of the process.

Assuming appliance 610 has not inserted itself into TLS handshake 633, when client sends HTTPs request message 634, it will be passed through to server 615 without inspection. Server 615 will then respond with HTTPs "OK" message 636.

The techniques described herein may also have beneficial applications when used in accordance with the HTTP2.0 protocol. In addition to TCP and TLS proxies, an HTTP2.0 proxy may also be required when the protocol to be used for communications between a client (such as client 205 or client 605) and a server (server 215 or server 615) is HTTP2.0. The HTTP2.0 proxy may be necessary because HTTP2.0 is a stateful protocol. If the parameters for the HTTP request that would need to be modified by an appliance (such as appliance 210 or appliance 610) would modify state-based attributes (e.g., a cookie from the client), an HTTP2.0 proxy is needed to maintain the state between the client and the server. On the other hand, by using the redirect techniques described herein, because a new connection is established based on the new parameters (as opposed to modifying parameters at a proxy), the use of an HTTP2.0 proxy may be avoided.

Figure 7:
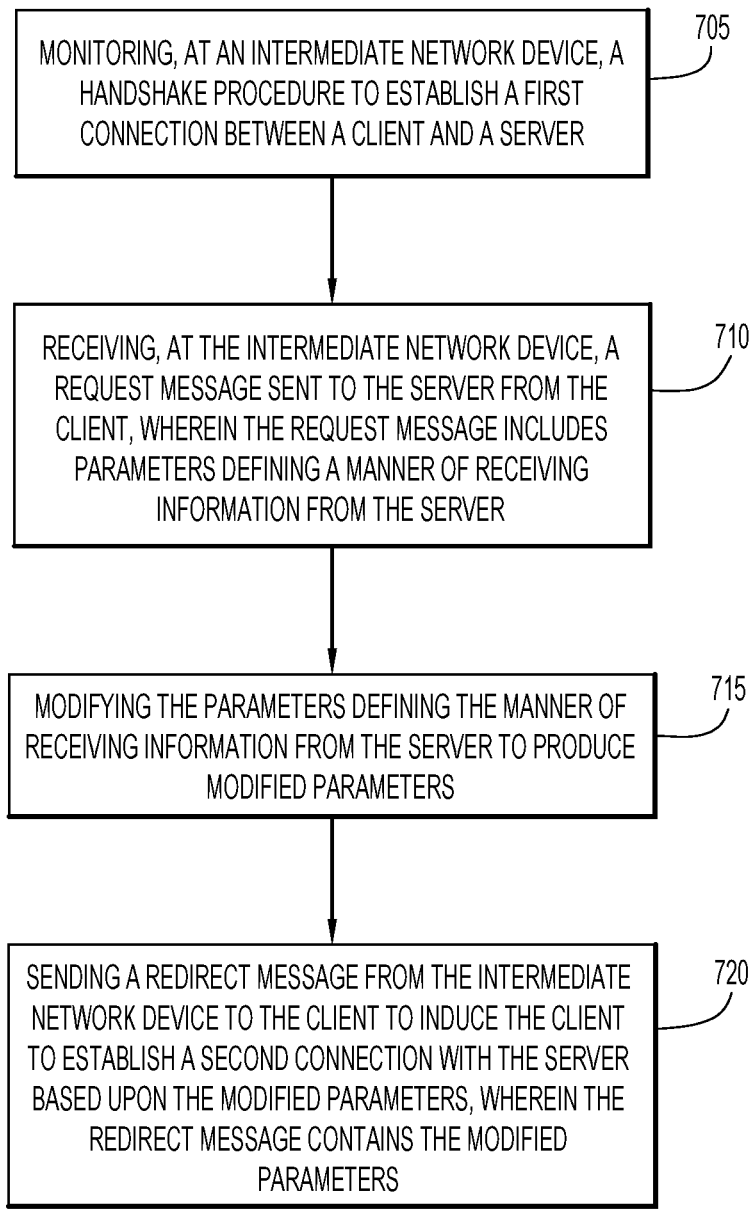
FIG. 7 is a flowchart illustrating a process for fastpath web sessions with HTTP header modification by redirecting clients, according to an example embodiment.

With reference now made to FIG. 7, depicted therein is a flowchart 700 illustrating a process for fastpath web sessions with HTTP header modification by redirecting clients. The process begins in operation 705 where a handshake procedure to establish a first connection between a client and a server is monitored at an intermediate network device. The intermediate network device may be embodied as a network appliance, such as network appliances 210 and 610 of FIGS. 2 and 6, configured to apply proxy and/or firewall services between the client and the server, such as clients 205 and 605 and severs 215 and 615 of FIGS. 2 and 6, respectively. The connection may be an HTTP connection, like that described in FIG. 2, or an HTTPs connection, like that described in FIG. 6.

In operation 710, a request message sent from the client to the server is received at the intermediate network device. The request message includes parameters defining a manner of receiving information from the server. For example, the request message may be an HTTP or HTTPs request message, and the parameters may include a URL, a "Cookies" options, the types of data that can be received by the client, the browser from which the request was sent, a method-type for the request message, the type of coding the client can accept, and others.

In operation 715, the parameters of the request message are modified by the intermediate network device to produce modified parameters. In operation 720, a redirect message is sent from the intermediate network device to the client to induce the client to establish a second connection with the server based upon the modified parameters. The redirect message of operation 720 includes the modifier parameters.

Examples of the process of flowchart 700 include the message exchanges illustrated in FIGS. 2 and 6, though the examples of FIGS. 2 and 6 include additional steps as described therein. The process of flowchart 700 represents a method by which the proxying of a TCP connection may be avoided. For example, a connection is monitored to determine if the connection complies with the policies of an intermediate network device (i.e., an appliance applying proxy or firewall services to network traffic). Instead of proxying the traffic to comply with the policies, the intermediate network devices sends an HTTP redirect message to the client device that induces the client to device to establish a new connection with the server based upon parameters that comply with the policies being enforced by the intermediate device. Because the new connection is based upon parameters that comply with policies of the intermediate device, proxying by the intermediate device may be avoided.

When the redirect message alters the URL of the initial request message, the client is redirected to form a new connection using the new URL instead of rewriting the URL in-line at the intermediate device. In plain-text HTTP connections, a three-tuple (client IP address, server IP address and server port) may be used to identify a new connection as the new connection being formed in response to the redirect message, and therefore, firewall and/or proxy rules may be omitted from the new connection, as the intermediate network device will understand that this new connection is being created to conform with the policies based upon the redirect message. Even if the new connection is formed in response to the redirect message, administrators will still have the option of intercepting and inspecting the content of the messages sent between the client and the server. In HTTPs connections, a three-tuple plus the TLS session ID (if present) may be used to identify the new connection as the result of the redirect message, and therefore, the new connection may be formed without the intermediate network device inserting itself between the client and the server as a TLS proxy. In HTTPs connections, the intermediate device may be configured by an administrator to continue to proxying connections that result from redirect messages until the client device associated with the connection receives a sufficiently high trust score, as determined by the intermediate device.

By implementing the techniques described herein, end-user experiences will be improved because sessions will execute without proxying or inspection (i.e., "fast-path" connections), when allowed by the inspection policies of proxies/firewalls. Appliance devices (e.g., proxies and firewalls) will be able to handle a greater number of simultaneous connections, because fewer resources will be needed to handle the "fast-path" connections. Finally, the requirement for an HTTP2.0 proxy may be eliminated because connections will be reestablished by the client device, as opposed to modified in-line by the proxy/firewall.

Figure 8:
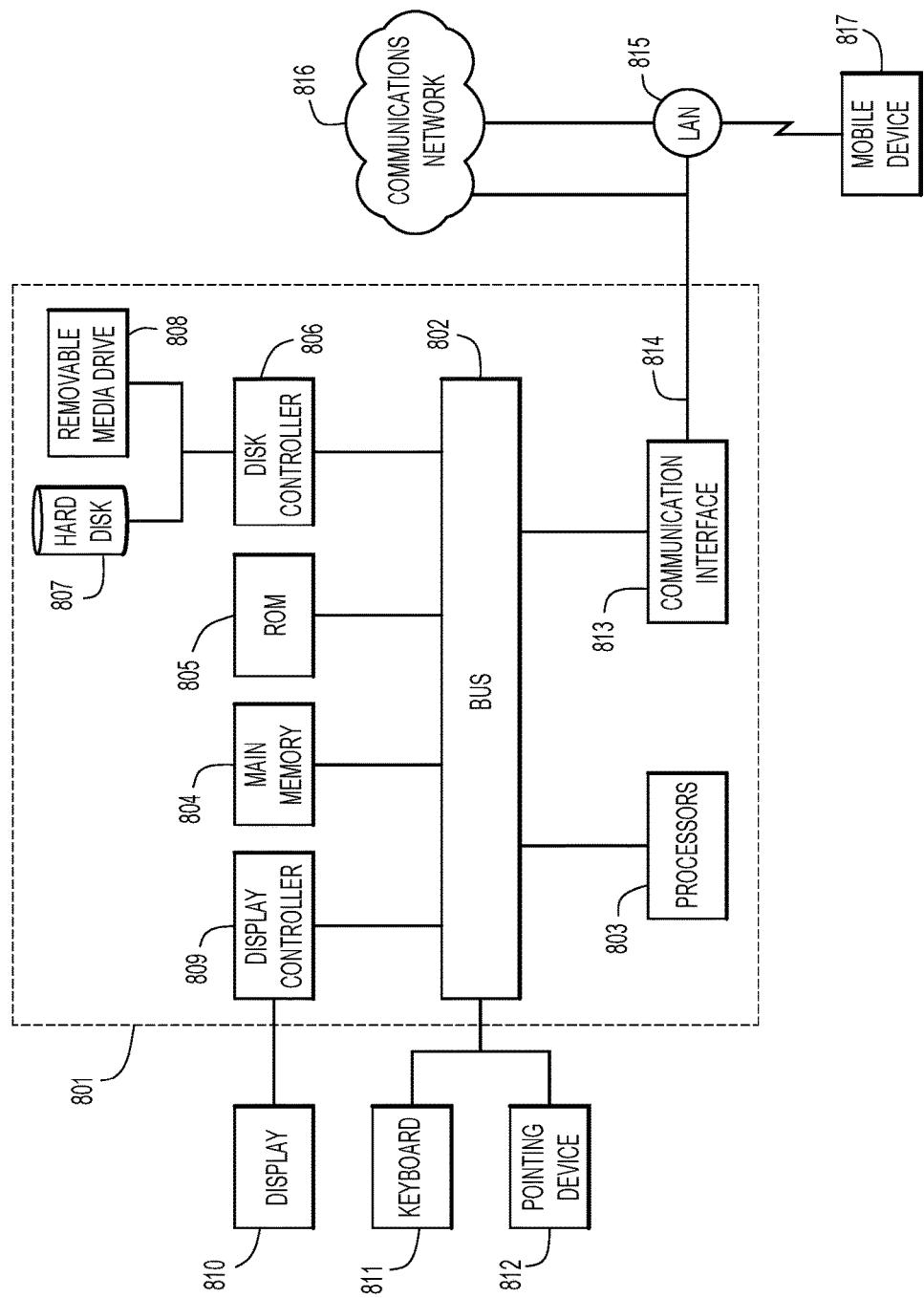
FIG. 8 is a device configured to provide fastpath web sessions with HTTP header modification by redirecting clients, according to an example embodiment.

With reference made to FIG. 8, illustrated therein is a computer system 801 upon which the embodiments presented may be implemented. The computer system 801 may be programmed to implement a computer based device, such as one or more of the client, server, or network appliance devices illustrated above in FIGS. 1 and 5. The computer system 801 includes a bus 802 or other communication mechanism for communicating information, and a processor 803 coupled with the bus 802 for processing the information. While the figure shows a single block 803 for a processor, it should be understood that the processors 803 represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 809 coupled to the bus 802 to control a display 810, such as a cathode ray tube (CRT) or a light emitting diode (LED) display, for displaying information to a computer user. The computer system 801 includes input devices, such as a keyboard 811 and a pointing device 812, for interacting with a computer user and providing information to the processor 803. The pointing device 812, for example, may be a mouse, a trackball, or a pointing stick for communicating direction information and command selections to the processor 803 and for controlling cursor movement on the display 810. The pointing device 812 may also be incorporated into the display device as, for example, a capacitive touchscreen and/or a resistive touchscreen. In addition, a printer may provide printed listings of data stored and/or generated by the computer system 801.

The computer system 801 performs a portion or all of the processing steps of the techniques described herein in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 801, for driving a device or devices for implementing the techniques described here, and for enabling the computer system 801 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local are network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular telephone.

In summary, presented herein are methods that include monitoring, at an intermediate network device, a handshake procedure to establish a first connection between a client and a server. A request message is received at the intermediate network device that includes parameters defining a manner of receiving information from the server. The parameters defining the manner of receiving information from the server are modified at the intermediate network device to produce modified parameters. A redirect message is sent from the intermediate network device to the client to induce the client to establish a second connection with the server based upon the modified parameters, wherein the redirect message contains the modified parameters. The method may include additional steps based upon, for example, whether the first connection is an HTTP or an HTTPs connection.

Also provided for herein is an apparatus comprising one or more processors and one or more network interface units. The one or more processors are configured to monitor a handshake procedure, where the handshake procedure is configured to establish a first connection between a client and a server. The processor is further configured to receive, via the network interface unit, a request message sent to the server from the client, wherein the request message includes parameters defining a manner of receiving information from the server. The processor is also configured to modify the parameters defining the manner of receiving information from the server to produce modified parameters. Finally, the processor is configured to send, via the network interface unit, a redirect message to the client to induce the client to establish a second connection with the server based upon the modified parameters, wherein the redirect message contains the modified parameters. The processor may be configured to perform additional actions based upon, for example, whether the first connection is an HTTP or an HTTPs connection.

In addition, also provided for herein are tangible, non-transitory computer readable media comprising instructions. The instructions, when executed, are operable to monitor, at an intermediate network device, a handshake procedure to establish a first connection between a client and a server. The instructions are further operable to receive, at the intermediate network device, a request message sent to the server from the client, wherein the request message includes parameters defining a manner of receiving information from the server. The instructions, when executed, modify, at the intermediate network device, the parameters defining the manner of receiving information from the server to produce modified parameters. The instructions are further operable to send a redirect message from the intermediate network device to the client to induce the client to establish a second connection with the server based upon the modified parameters, wherein the redirect message contains the modified parameters.

In other words, embodiments described herein provide for using an HTTP redirect message to achieve URL rewrites. The use of the redirect messages avoid the rewriting the URL inline (i.e., at an intermediate network device, like a security appliance) and instead redirect the client with the updated URL. In plain-text HTTP, a 3-tuple (i.e., the client IP address, the server IP address and the server port) is used to identify the redirected new connection and apply firewall policy rules. For example, the redirected connection that matches the 3-tuple can avoid being intercepted at the intermediate network device. In HTTPs, the redirected connection that matches the 3-tuple as well as the TLS "Session ID" (if present) of the original connection can avoid being intercepted and/or proxied at that intermediate network device. The intermediate network device nevertheless has the option to continue to intercept and inspect the redirected connection based on the firewall and inspection policies set by an IT administrator. By implementing these techniques, intermediate network devices (i.e., security appliances) may safely avoid TCP/TLS proxying thereby providing fast-path redirected flows with minimal data-path processing and increased throughput. The fast-path redirected flows improve end user experience, allow the intermediate network device to handle a greater number of connections, and can avoid having to implement an HTTP2.0 proxy.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   monitoring, at an intermediate network device, a handshake procedure between a client and a server to establish a first connection between the client and the server, wherein the handshake procedure comprises messages sent from the client and received at the server;
   receiving, at the intermediate network device, a request message sent to the server from the client, wherein the request message includes parameters defining a manner of receiving information from the server, wherein the request message indicates the server as a host for the request;
   modifying, at the intermediate network device, the parameters defining the manner of receiving information from the server to produce modified parameters;
   sending a redirect message from the intermediate network device to the client to induce the client to establish a second connection with the server based upon the modified parameters, wherein the redirect message contains the modified parameters; and
   receiving, at the intermediate network device, a second request message sent to the server from the client over the second connection, wherein the second request message indicates the server as a host for the second request; and
   passing the second request to the server without applying proxy services to the second request message, wherein fulfillment of the second request is enhanced by the modified parameters and the absence of the proxy services.

2. The method of claim 1, further comprising proxying the first connection at the intermediate network device.

3. The method of claim 2, further comprising monitoring a handshake procedure between the client and the server to establish the second connection in order to determine if a session identifier for the second connection matches a session identifier for the first connection.

4. The method of claim 3, further comprising passing through the intermediate network device a message of the second connection without proxying the message of the second connection in response to determining the session identifier for the second connection matches the session identifier for the first connection.

5. The method of claim 4, further comprising scoring, at the intermediate network device, a trust level of the client, and wherein passing through the message of the second connection comprises passing through the message of the second connection in response to the trust level of the client.

6. The method of claim 3, further comprising proxying the second connection in response to determining the session identifier for the second connection does not match the session identifier for the first connection.

7. The method of claim 2, wherein the first connection comprises a secure Hypertext Transfer Protocol connection.

8. The method of claim 1, wherein the parameters defining the manner of receiving information from the server comprises a Uniform Resource Locator, and wherein modifying comprises modifying the Uniform Resource Locator.

9. The method of claim 8, wherein modifying comprises modifying the Uniform Resource Locator to include a safe search indicator.

10. The method of claim 1, further comprising evaluating messages sent between the client and the server subsequent to the second request message to verify that the messages conform with the modified parameters.

11. The method of claim 1, wherein the first connection comprises a Hypertext Transfer Protocol connection.

12. The method of claim 1, further comprising terminating the first connection between the client and the server.

13. The method of claim 1, wherein modifying the parameters comprises modifying a cookie option parameter.

14. An apparatus comprising:
a network interface unit; and
a processor, wherein the processor is configured to:
monitor a handshake procedure between a client and a server to establish a first connection between the client and the server, wherein the handshake procedure comprises messages sent from the client and received at the server;
receive, via the network interface unit, a request message sent to the server from the client, wherein the request message includes parameters defining a manner of receiving information from the server, wherein the request message indicates the server as a host for the request;
modify the parameters defining the manner of receiving information from the server to produce modified parameters;
send, via the network interface unit, a redirect message to the client to induce the client to establish a second connection with the server based upon the modified parameters, wherein the redirect message contains the modified parameters;
receive, via the network interface unit, a second request message sent to the server from the client over the second connection, wherein the second request message indicates the server as a host for the second request; and
pass the second request to the server without applying proxy services to the second request message, wherein fulfillment of the second request is enhanced by the modified parameters and the absence of the proxy services.

15. The apparatus of claim 14, wherein the processor is further configured to proxy the first connection.

16. The apparatus of claim 15, wherein the processor is further configured to:
monitor a handshake procedure between the client and the server to establish the second connection in order to determine if a session identifier for the second connection matches a session identifier for the first connection; and
passing through the intermediate network device a message of the second connection without proxying the message of the second connection in response to determining the session identifier for the second connection matches the session identifier for the first connection.

17. The apparatus of claim 14, wherein the processor is further configured modify the parameters by modifying a cookie option parameter.

18. One or more non-transitory computer readable storage media encoded with software comprising computer executable instructions and when the software is executed operable to:
monitor, at an intermediate network device, a handshake procedure between a client and a server to establish a first connection between the client and the server, wherein the handshake procedure comprises messages sent from the client and received at the server;
receive, at the intermediate network device, a request message sent to the server from the client, wherein the request message includes parameters defining a manner of receiving information from the server, wherein the request message indicates the server as a host for the request;
modify, at the intermediate network device, the parameters defining the manner of receiving information from the server to produce modified parameters;
send a redirect message from the intermediate network device to the client to induce the client to establish a second connection with the server based upon the modified parameters, wherein the redirect message contains the modified parameters;
receive, at the intermediate network device, a second request message sent to the server from the client over the second connection, wherein the second request message indicates the server as a host for the second request; and
pass the second request to the server without applying proxy services to the second request message, wherein fulfillment of the second request is enhanced by the modified parameters and the absence of the proxy services.

19. The computer readable storage media of claim 18, wherein the instructions are further operable to:
proxy the first connection at the intermediate network device;
monitor a handshake procedure between the client and the server to establish the second connection in order to determine if a session identifier for the second connection matches a session identifier for the first connection; and
pass through the intermediate network device a message of the second connection without proxying the message of the second connection in response to determining the session identifier for the second connection matches the session identifier for the first connection.

20. The computer readable storage media of claim 18, wherein the instructions operable to modify the parameters comprise instructions operable to modify a cookie option parameter.

* * * * *